United States Patent
Suzuki et al.

[11] Patent Number: 5,361,745
[45] Date of Patent: Nov. 8, 1994

[54] COMBUSTION STATE CONTROL APPARATUS FOR INTERNAL COMBUSTION ENGINE

[75] Inventors: Keisuke Suzuki; Hiroshi Satoh, both of Yokosuka, Japan

[73] Assignee: Nissan Motor Co., Ltd., Yokohama, Japan

[21] Appl. No.: 89,345

[22] Filed: Jul. 12, 1993

[30] Foreign Application Priority Data

Jul. 21, 1992 [JP] Japan .................. 4-194178

[51] Int. Cl.⁵ ............................................ F02B 47/08
[52] U.S. Cl. ...................................... 123/698; 123/568
[58] Field of Search ............... 123/698, 425, 435, 676, 123/568, 585, 571; 73/35; 364/431.08

[56] References Cited

U.S. PATENT DOCUMENTS

| | | | |
|---|---|---|---|
| 4,453,379 | 6/1984 | Kawamura et al. | 60/278 |
| 4,625,697 | 12/1986 | Hosaka | 123/478 |
| 4,640,249 | 2/1987 | Kawamura et al. | 123/425 |
| 4,748,959 | 6/1988 | Cook et al. | 123/520 |
| 4,750,103 | 6/1988 | Abo et al. | 364/431.08 |
| 5,125,385 | 6/1992 | Frinzel | 123/698 |
| 5,150,686 | 9/1992 | Okawa et al. | 123/698 |
| 5,172,550 | 12/1992 | Takeshima | 60/278 |
| 5,209,214 | 5/1993 | Ikuta et al. | 123/698 |

FOREIGN PATENT DOCUMENTS

| | | | |
|---|---|---|---|
| 56-129746 | 10/1981 | Japan | 123/698 |
| 57-041451 | 3/1982 | Japan | 123/698 |
| 60-173361 | 9/1985 | Japan | 123/698 |
| 62-085148 | 4/1987 | Japan | 123/698 |

*Primary Examiner*—Raymond A. Nelli
*Attorney, Agent, or Firm*—Foley & Lardner

[57] ABSTRACT

An apparatus for controlling an engine operation such as EGR rate for an internal combustion engine is disclosed with an air/fuel mixture ratio control. In the control apparatus, a variable representing a characteristic of a combustion state in the engine is detected and a difference of the combustion state variable, a target value is averaged for each rich/lean period T determined from the variation of a feedback correction coefficient so that a basic EGR (Exhaust Gas Recirculation) rate determined according to the engine operating condition is corrected on the basis of the average value to derive a final EGR rate. Thus, the variation in the EGR rate cannot be amplified or incremented even when the variation in the combustion state variable occurs due to the influence of the variation in the air/fuel mixture ratio.

11 Claims, 8 Drawing Sheets

COMBUSTION STATE CONTROL APPARATUS FOR INTERNAL COMBUSTION ENGINE

BACKGROUND OF THE INVENTION

The present invention relates generally to an apparatus for detecting and controlling a combustion state in an internal combustion engine.

A Japanese Patent Application First Publication No. Showa 62-85148 (published on Apr. 18, 1987) exemplifies a previously proposed total engine control apparatus for an internal combustion engine.

In the above-indentified Japanese Patent Application First Publication discloses an Exhaust Gas Recirculation System (hereinafter simply referred to as EGR) rate control in which a basic EGR rate is derived from a look-up table of a basic EGR rate on the basis of an engine operating condition such as an engine revolution speed and an engine lead, a combustion interval of time is calculated on the basis of a signal derived from an inner cylinder pressure sensor installed For each engine cylinder, a correction quantity of the basic EGR rate is derived on the basis of the engine revolution speed and intake air quantity (engine operating condition) and on tile basis of an optimum combustion interval map, the correction quantity is used to correct the basic EGR rate to derive a final EGR rate, an EGR valve is operated via driving means on the basis of the final EGR rate so that a recirculation quantity of EGR is optimally controlled.

On the other hand, an air/fuel mixture ratio control apparatus is generally such that when the control for a fuel supply quantity is executed, a feedback correction coefficient is set according to a rich state or lean state of a detected air/fuel mixture ratio based on a signal output from an oxygen concentration ($O_2$) sensor installed on an exhaust gas passage, the fuel supply quantity is corrected on the basis of the feedback correction coefficient so as to derive a final fuel supply quantity, thus the air/fuel mixture being feedback controlled to reach a stoichiometric air/fuel mixture ratio. This control of air/fuel mixture ratio causes a periodic variation in the air/fuel mixture ratio.

The above-described air/fuel mixture ratio control and EGR ratio control systems are also exemplified by Japanese Patent Application First Publications No. Showa 60-173361, No. Showa 57-41451, No. Showa 60-173361.

SUMMARY OF THE INVENTION

It is a principal object of the present invention to provide an improved apparatus for controlling a combustion state for an internal combustion engine in which a stable control of the EGR rate is achieved without influence of tile variation of the air/fuel mixture ratio.

It is noted that, in the previously proposed combustion state control apparatuses, the control for the EGR rate is carried out without the fact of the combustion state such as the combustion interval of time which is varied upon an influence of variation in the air/fuel mixture ratio taken into consideration. In addition, since the variation in the combustion state based on the influence of the variation of the air/fuel mixture ratio is deemed to be caused by a deviation in the EGR rate and the EGR rate is always controlled for each combustion, an excessive control for the EGR rate, in worst case, is brought out so as to inversely promote the variation of the combustion with slow response characteristic of the EGR control valve, thus exceeding a safe limit of the EGR rate.

The above-described object can be achieved by providing a control apparatus for an internal combustion engine comprising: a) first means for detecting an engine operating condition; b) second means for setting a basic EGR rate on the basis of the detected engine operating condition; c) third means for detecting an inner cylinder pressure of the engine and outputting a signal waveform representing the inner cylinder pressure variation; d) fourth means for detecting a combustion state variable on the basis of the inner cylinder pressure variation signal waveform for each combustion of the engine; e) fifth means for detecting an air/fuel mixture ratio of the engine; f) sixth means for averaging the combustion state variable for each predetermined period of a rich state and lean state of the air/fuel mixture ratio based on the output signal of said fifth means; g) seventh means for correcting the basic EGR rate on the basis of an average value of the combustion variable derived by said sixth means to derive a final EGR rate; and, h) eighth means for controlling an exhaust gas recirculation from an exhaust gas system of tile engine to an intake air system thereof on the basis of the final EGR rate.

The above-described object can also be achieved by an apparatus for controlling an EGR rate with a variation in air/fuel mixture ratio of an internal combustion engine taken into consideration, having an EGR control valve located in a passage communicated from an exhaust gas passage and intake air passage of the engine, said EGR rate controlling apparatus comprising: a) an air fuel mixture ratio sensor which is located in an exhaust gas passage of tile engine so as to provide an output signal indicating the air/fuel mixture ratio of the engine; b) an engine operating condition sensor which is so constructed to detect an engine operating condition including an engine load and engine revolution speed; c) basic EGR rate calculating means for deriving a basic EGR rate on the basis of the engine load and engine revolution speed; d) combustion state determining factor detecting means for detecting a combustion state determining factor on the basis of each inner cylinder pressure variation of each engine cylinder; e) rich/lean period determining means for determining a reverse of the air/fuel mixture ratio from a rich state to a lean state and vice versa on the basis of the variation in the detected air/fuel mixture ratio; f) final EGR rate determining means for determining a final EGR rate for each rich/lean period on the basis of an average value of the combustion state determining factor for each rich/lean period and the basic EGR rate; and, g) duty ratio signal output means for producing and outputting a pulse signal having a duty ratio corresponding to the final EGR rate to an electromagnetic valve associated with an EGR control valve.

DESCRIPTION OF THE PREFERRED EMBODIMENTS

Reference will, hereinafter, be made to the drawings in order to facilitate a better understanding of the present invention.

Figure 1:
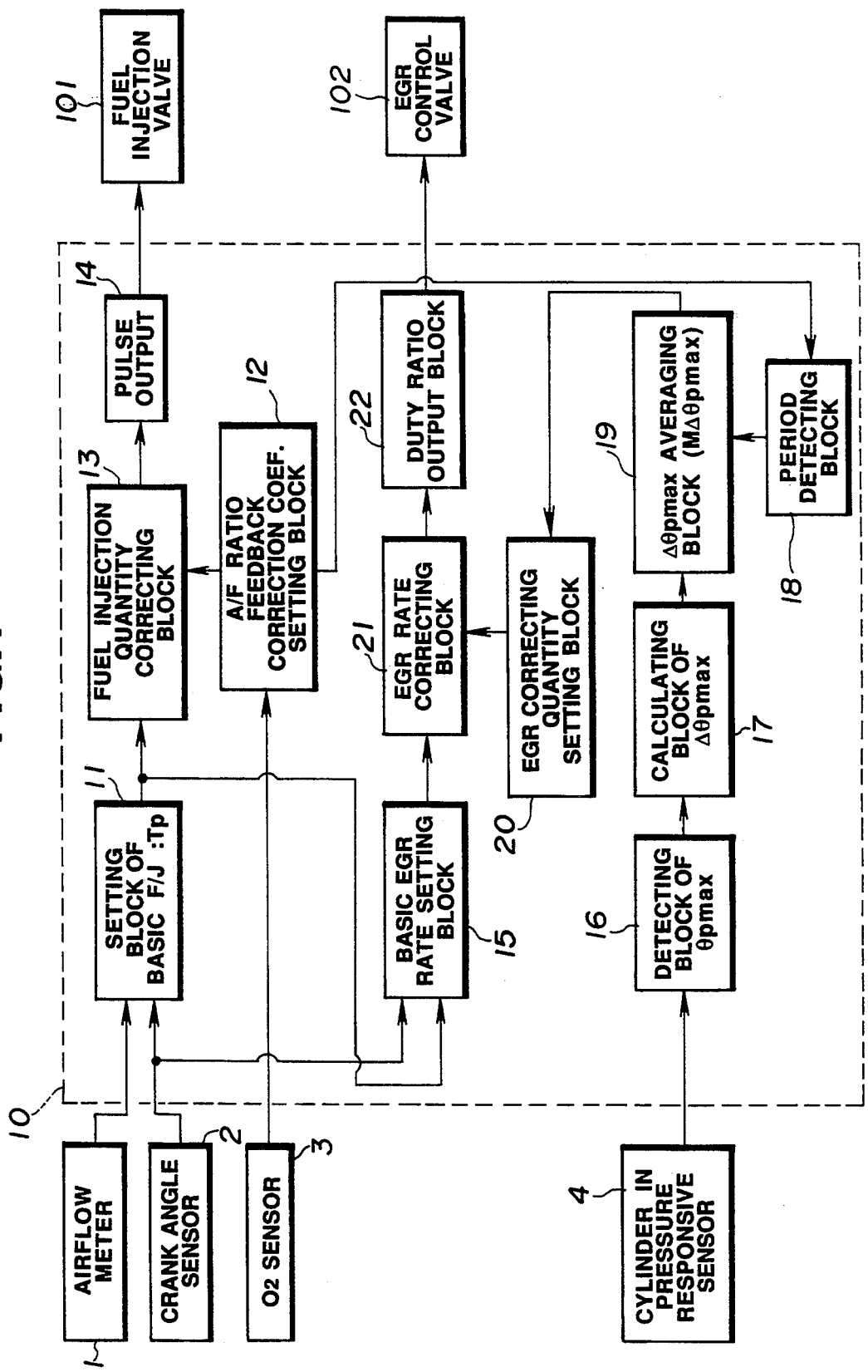
FIG. 1 is a circuit block diagram of a combustion state controlling apparatus in a preferred embodiment according to the present invention.

FIG. 1 shows a preferred embodiment of a combustion state controlling apparatus according to the present invention.

It is noted that the structure of an engine control element and sensor is exemplified by a U.S. Pat. No. 4,625,697 issued on Dec. 2, 1986, the disclosure of which is herein incorporated by reference.

It is also be noted that an inner cylinder pressure sensor is exemplified by U.S. Pat. No. 4,640,249 issued on Feb. 3, 1987 and U.S. Pat. No. 4,750,103 issued on Jan. 7, 1988, the disclosure of which are herein incorporated by reference.

It is also noted that a structure of the EGR system is exemplified by a U.S. Pat. No. 4,453,379 issued on Jan. 12, 1984, the disclosure of which is herein incorporated by reference.

Referring back to FIG. 1, an airflow meter 1 and crank angle sensor 2 are installed in an engine to detect an intake air quantity Q and engine revolution speed N as engine operating parameters.

Figure 2:
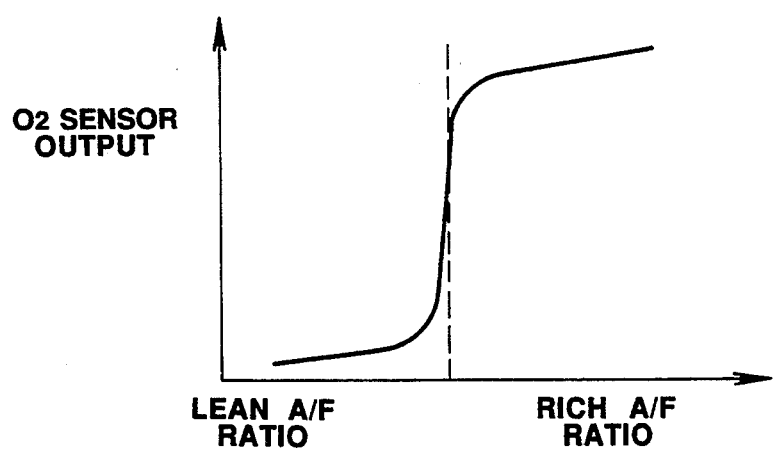
FIG. 2 is a characteristic graph of output signal of $O_2$ sensor shown in FIG. 1.

An oxygen concentration ($O_2$) sensor 3 is installed in an exhaust gas passage of the engine to detect an air/fuel mixture ratio, i.e., a rich state and lean state of the air/fuel mixture ratio (refer to FIG. 2).

A plurality of washer type piezoelectric pressure sensor 4 are installed on respective ignition plugs of respective cylinders of the engine to detect respective inner cylinder pressures.

These sensor output signals from those sensors 1 to 4 are transmitted to a microcomputer 10. The microcomputer 10 generally comprises a CPU, ROM, RAM, I/O unit, and common bus.

Then, the microcomputer 10 execute predetermined calculation processings and outputs control signals to, e.g., an electromagnetic fuel injection valve 101 installed in each intake air passage of the respective cylinders so as to control a fuel injection quantity (fuel injection time interval) and to an EGR control valve 102 installed in an EGR passage interposed between the intake air system and exhaust gas system of the engine so as to control an opening angle of the EGR control valve. It is noted that the EGR control valve 102 is generally of a diaphragm negative pressure responsive type, the opening angle of the EGR control valve 102 being controlled by controlling a duty ratio supplied to an electromagnetic valve of a negative pressure adjusting mechanism.

The microcomputer 10 functionally includes: a) basic fuel injection quantity setting block 11; b) air/fuel mixture ratio feedback correction coefficient setting block 12; c) fuel injection quantity correcting block 13; and d) fuel injection pulse output block 14.

The microcomputer 10 functionally further includes: e) a basic EGR ratio setting block 15; f) inner cylinder pressure maximum timing ($\theta$pmax) detecting block 16; g) difference ($\Delta\theta$pmax) calculating block 17; h) rich/lean period detecting block 18; difference averaging ($\Delta\theta$pmax) block 19; i) EGR rate correction quantity setting block 20; j) EGR rate correcting block 21; and k) duty ratio pulse output block 22.

The basic fuel injection quantity setting block 11 sets a basic fuel injection quantity Tp on the basis of the intake air quantity Q detected by means of the signal from the airflow meter and of the engine revolution speed N detected by means of the crank angle sensor 2: $Tp = K \times Q/N$ (K denotes a constant).

Figure 3:
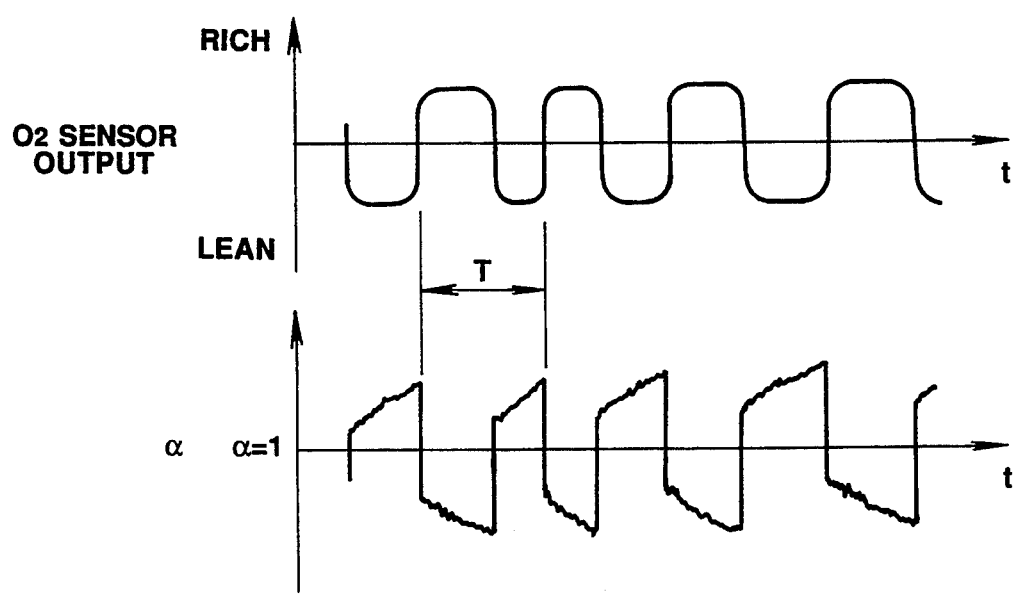
FIG. 3 is integrally a waveform chart indicating a relationship between $O_2$ sensor output signal and a variation in a feedback correction coefficient $\alpha$.

The feedback correction coefficient setting block 12 serves to set the air/fuel mixture ratio feedback correction coefficient $\alpha$ according to the air/fuel mixture ratio detected and based on the output signal of $O_2$ sensor 3 in the mode of PI (proportion-integration) control (refer to FIG. 3).

The fuel injection quantity correcting block 13 corrects the basic fuel injection quantity Tp using various correction coefficients COEF including a correction coefficient for a coolant temperature and air/fuel mixture ratio feedback correction coefficient $\alpha$ to set a final fuel injection quantity Ti ($Ti = Tp \times COEF \times \alpha$.

The fuel injection pulse output block 14 outputs a fuel injection pulse to each one of the fuel injection valves whose pulsewidth corresponds to the final fuel injection quantity Ti at a predetermined timing synchronized with an engine revolution.

The basic EGR rate setting block 15 refers to a predetermined map according to the basic fuel injection quantity Tp and engine revolution speed N to set the basic EGR rate $EGR_{map}$.

Figure 4:
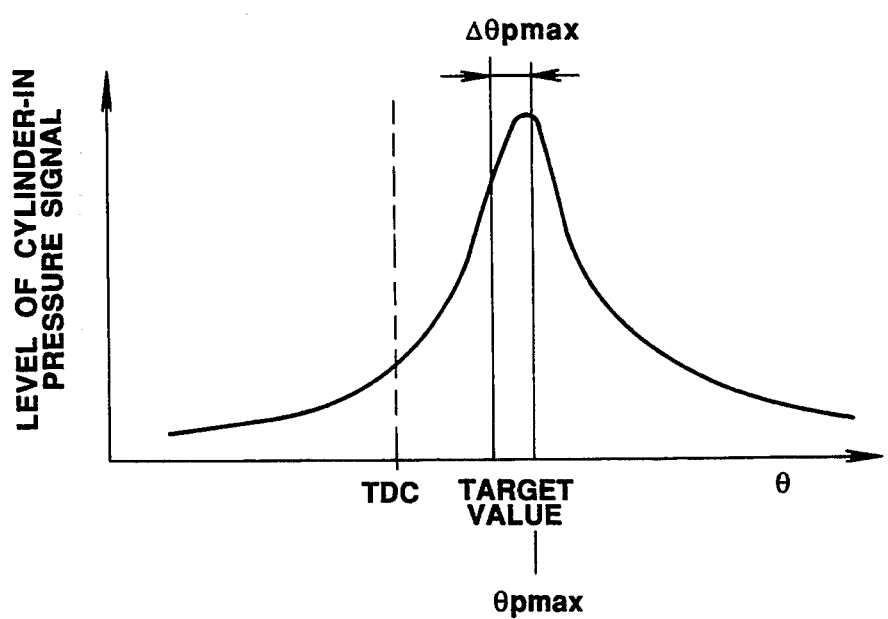
FIG. 4 is a characteristic graph of inner cylinder pressure signal and $\Delta\theta$pmax.

The maximum inner cylinder pressure timing detecting block 16 reads the inner cylinder pressure P detected by each inner cylinder pressure sensor 4 at a constant sampling period during a predetermined interval of crank angle after an upper top dead center in each compression stroke and detects an inner cylinder pressure maximum timing $\theta$pmax at which the inner cylinder pressure P becomes maximum (refer to FIG. 4).

The difference calculating block 17 calculates a difference $\Delta\theta$pmax between the detected inner cylinder maximum timing $\theta$pmax and a predetermined target value (for example, 15° after the upper top dead center in the compression stroke) ($\Delta\theta$pmax = $\theta$pmax − target value, refer to FIG. 4).

In the preferred embodiment, the combustion state is determined according to the inner cylinder maximum timing $\theta$pmax, a combustion state variable (combustion state determining factor) being the difference $\Delta\theta$pmax between $\theta$pmax and target value.

The rich/lean period detecting block 18 detects the rich/lean period (refer to T of FIG. 3) according to the variation in the air/fuel mixture ratio feedback correction coefficient a set on the basis of the output signal of the $O_2$ sensor 3 in the air/fuel mixture ratio feedback correction coefficient setting block 12.

The difference averaging block 19 derives an average value M$\Delta\theta$pmax of the difference $\theta$pmax for each rich/lean period T.

The EGR rate correction quantity calculating block 20 serves to set and update the correction quantity $\Delta$EGR by subtracting the difference averaging M$\Delta\theta$pmax multiplied by a constant k from a previous correction quantity $\Delta\theta$pmax.

$$\Delta EGR = \Delta EGR - k \times M\Delta\theta pmax.$$

The EGR rate correcting block 21 adds the basic EGR rate $EGR_{map}$ to the correction quantity $\Delta$EGR to derive a final EGR rate.

$$EGR\ rate = EGR_{map} + \Delta EGR.$$

The duty ratio output block 21 outputs a corresponding duty ratio signal to derive the calculated final EGR rate so as to control the opening angle of the EGR control valve 102.

Next, operational flowcharts executed by the microcomputer 10 will be explained below with references to FIGS. 5 through 7.

Figure 5:
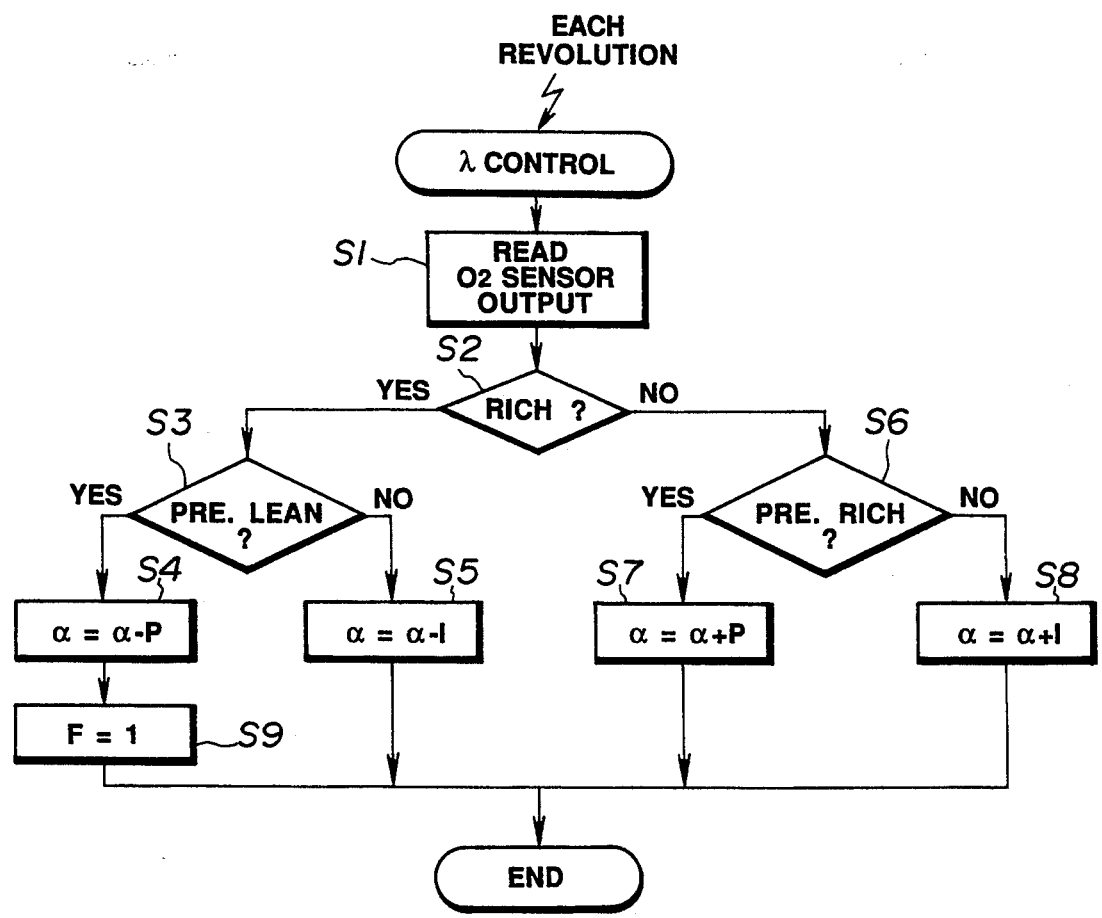
FIG. 5 is an operational flowchart of setting the feedback correction coefficient $\alpha$.

FIG. 5 shows a routine of setting the air/fuel mixture ratio feedback correction coefficient ($\lambda$ control) and executed for each engine revolution.

At a step S1, the CPU reads the output signal of the $O_2$ sensor 3 and at a step S2 the CPU determines the rich state or lean state.

At a step S3, if the CPU determines the rich state, the CPU determines whether a previous lean state occurred. If YES at the step S3, i.e., the reverse of the rich state from the lean state (lean→rich) occurs, the routine goes to a step S4 in which the air/fuel mixture ratio feedback correction coefficient $\alpha$ is incremented by a predetermined proportion P with respect to the previous value.

If NO at the step S3 (during the lean state), the routine goes to a step S8 in which the air/fuel mixture ratio feedback correction coefficient $\alpha$ is incremented by an predetermined integral I with respect to the previous value. It is noted that P>>I.

It is noted as shown in FIG. 5 that a step S9 is provided in the routine next the step S4. At the step S9, a period detection flag F is set to indicate the detection of the rich/lean period T.

Figure 6:
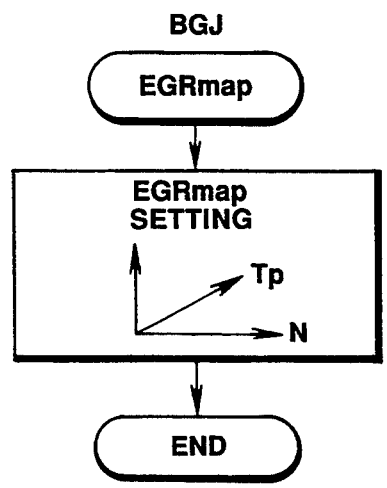
FIG. 6 is an operational flowchart of setting a basic EGR rate.

FIG. 6 shows a routine of setting the basic EGR rate ($EGR_{map}$) and is executed as a background job.

In the routine shown in FIG. 6, the basic EGR rate $EGR_{map}$ is set by referring to the predetermined map on the basis of the engine revolution speed N and engine load such as the basic fuel injection quantity Tp.

Figure 7:
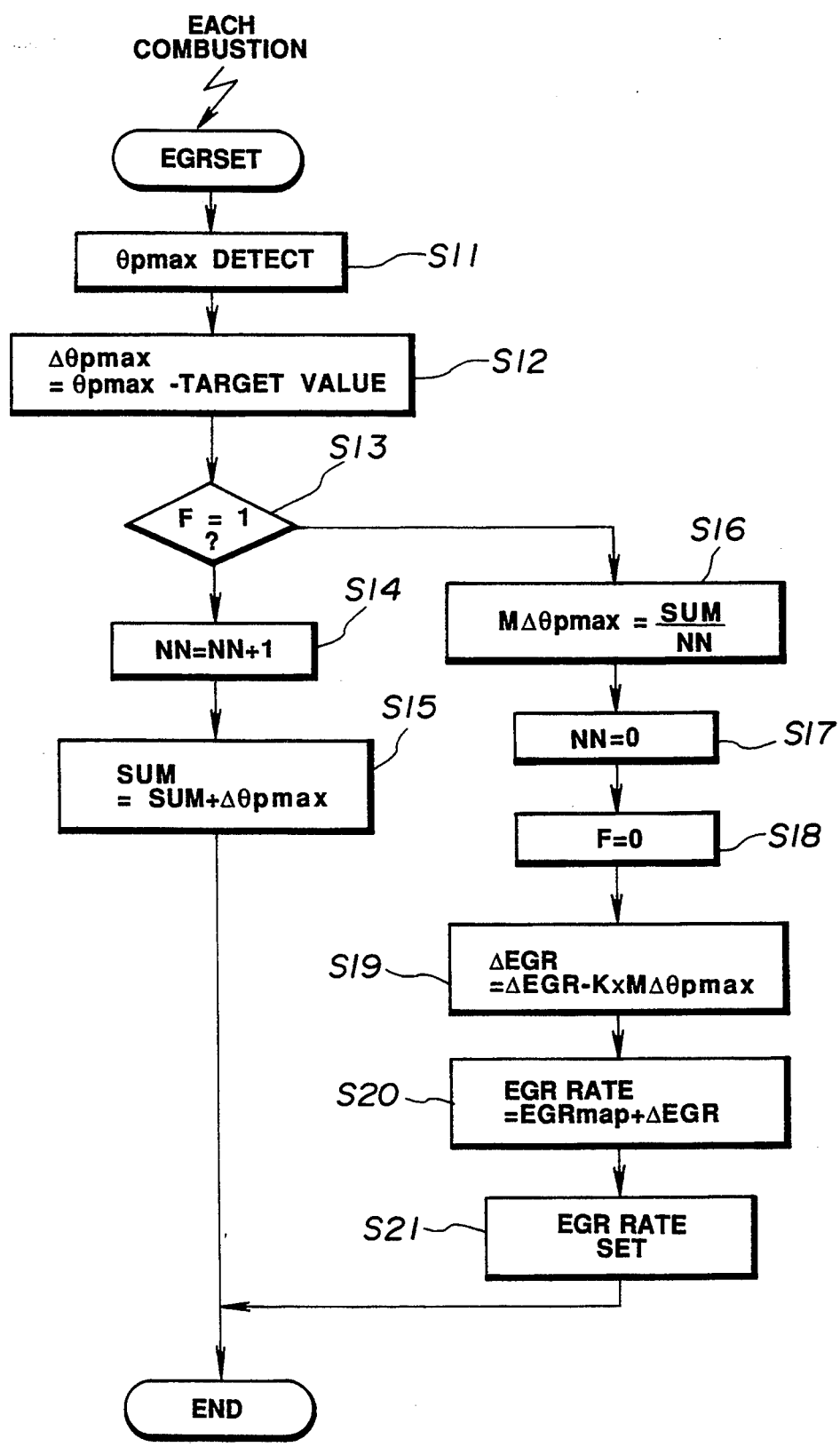
FIG. 7 is an operational flowchart of detection of $\theta$pmax through output of duty ratio.

FIG. 7 shows a routine from the detection of $\theta$pmax to a duty ratio output (EGRSET) executed for each combustion.

At a step S11, the CPU detects the inner cylinder pressure maximum timing $\theta$pmax.

At a step S12, the CPU calculates the subtraction of the detected inner cylinder pressure maximum timing $\theta$pmax and the target value ($\Delta\theta$pmax = $\theta$pmax − target value.

At a step S13, tile CPU determines a value of the flag F at the step S9.

If F=0, the routine goes to a step S14 in which the number of samplings NN of the difference $\Delta\theta$pmax is incremented by one.

At the next step S14, the presently detected difference $\Delta\theta$pmax is added to an accumulated value SUM and the routine is ended.

On the other hand, if F=1, the CPU executes steps S16 to S21.

In the way described above, the steps S16 to S21 are executed for each detection of the rich/lean period T.

At the step S16, the CPU derives the accumulated value SUM of the difference $\Delta\theta$pmax and the number of samplings NN and derives the average value of difference M$\Delta\theta$pmax (=SUM/NN).

At the step S17, the CPU resets the number of samplings NN to zero and at the next step S18 the CPU resets the flag F to zero.

At the step S19, the correction quantity $\Delta$EGR is set and updated by subtracting a value of the difference average value M$\Delta\theta$pmax multiplied by the constant k from the previous $\Delta$EGR as follows:

$$\Delta EGR = \Delta EGR - k \times M\Delta\theta pmax.$$

At the step S20, the final EGR rate is set by adding the basic EGR rate $EGR_{map}$ to the correction quantity $\Delta$EGR.

$$EGR\ rate = EGR_{map} + \Delta EGR.$$

At the step S21, the CPU outputs the duty ratio signal corresponding to the calculated EGR rate so as to control the opening angle of the EGR control valve 102.

Figure 8:
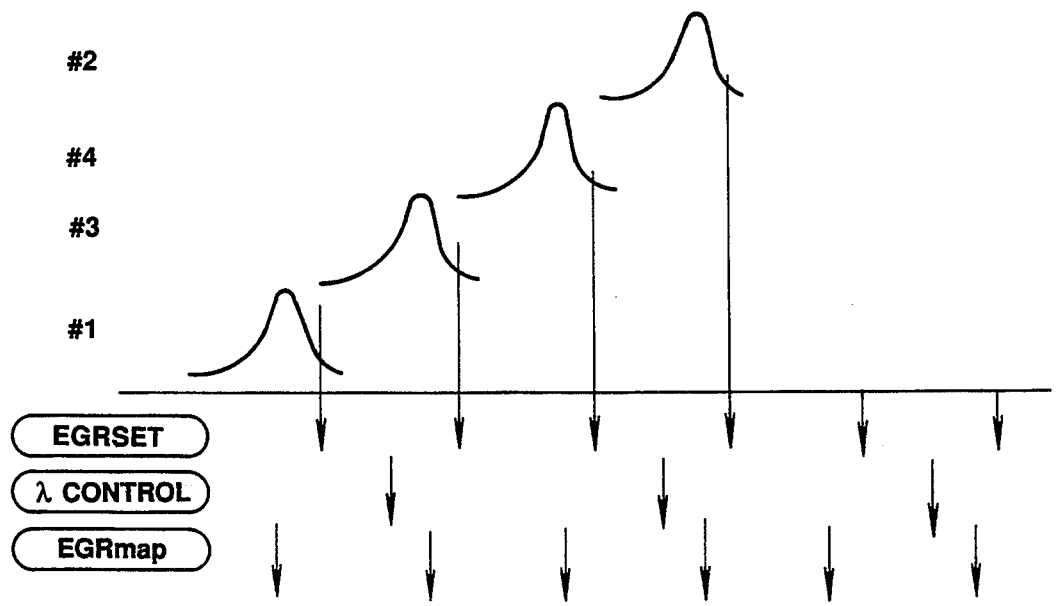
FIG. 8 is a timing chart for explaining an execution timing of each program routine shown in FIGS. 5 through 7.
Figure 9:
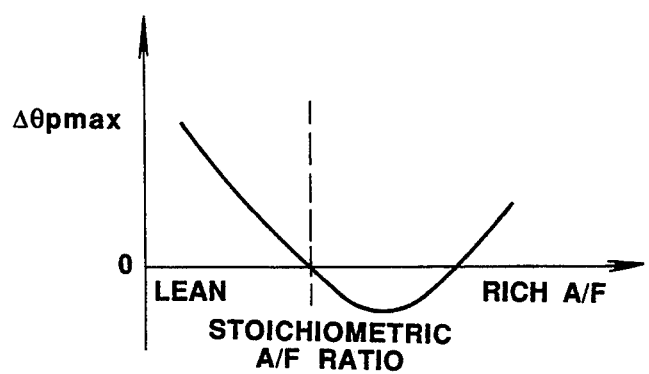
FIG. 9 is a characteristic graph of the air/fuel mixture ratio and $\Delta\theta$pmax.

FIG. 8 shows a timing chart for explaining an execution timing for each routine of FIGS. 5 to 7 in the case of a four cylinder engine.

Next, the actions and effects achieved by the present invention will be explained below.

The $O_2$ sensor 3 provides an output characteristic shown in FIG. 2.

Thus, when the fuel injection quantity is corrected on the basis of the sensor output signal so as to carry out the air/fuel mixture ratio feedback control.

The air/fuel mixture ratio is periodically varied as indicated by the variation pattern of the feedback correction coefficient $\alpha$ shown in FIG. 3.

Figure 10:
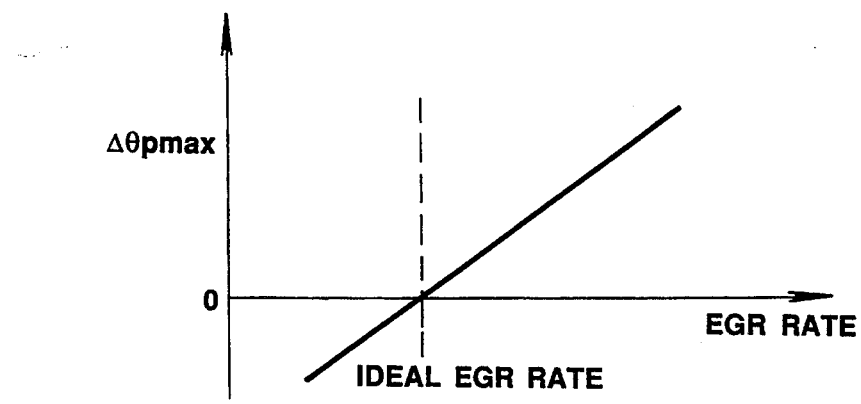
FIG. 10 is a characteristic graph of the EGR rate and $\Delta\theta$pmax.

In addition, the air/fuel mixture ratio and $\Delta\theta$pmax have mutually relationship as shown in FIG. 10.

Figure 11:
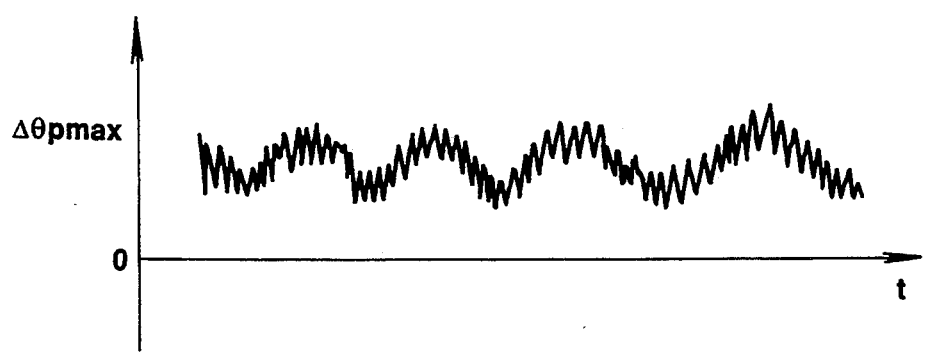
FIG. 11 is a characteristic graph of a variation pattern of $\Delta\theta$pmax.

Thus, if the final EGR rate is deviated from an ideal EGR rate due to the occurrence of clogs in the EGR control valve 102, $\Delta\theta$pmax is varied as shown in FIG. 11 due to the periodic variation based on the variation in the air/fuel mixture ratio, together with a bias deviation of the deviation of the EGR rate.

Thus, when the EGR rate is corrected as described above, the bias component of the variation in the EGR rate is eliminated.

Specifically, when the rich/lean period T of the feedback control of the air/fuel mixture ratio is derived from the variation of the feedback correction coefficient $\alpha$ shown in FIG. 3, the average value of $\Delta\theta$pmax is derived during the rich/lean period to derive the bias component and the EGR rate is corrected for each period of the air/fuel mixture ratio feedback control on the basis of the bias data.

Figure 12:
FIG. 12 is also a characteristic graph of the variation pattern of $\Delta\theta$pmax in the case of the execution of control in the preferred embodiment.

Consequently, $\Delta\theta$pmax is varied as shown in FIG. 12 so that the bias component is eliminated and an MBT (Minimum value for Best Torque) control can be achieved.

In the preferred embodiment described above, the inner cylinder pressure maximum timing $\theta$pmax can determine the combustion state, the combustion state variable being constituted by the difference $\Delta\theta$pmax between $\theta$pmax and target value $\Delta\theta$pmax.

Figure 13:
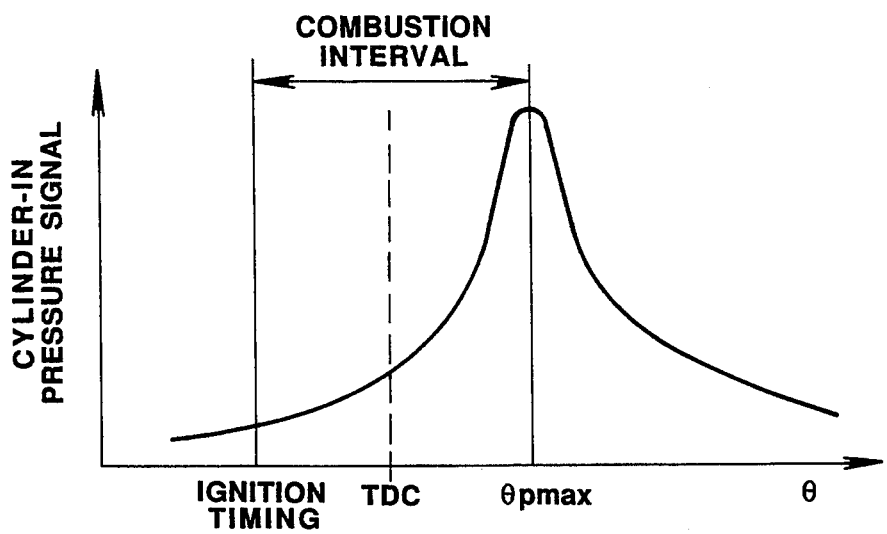
FIG. 13 is a characteristic graph of a combustion interval of time as an example of combustion state variable.
Figure 14:
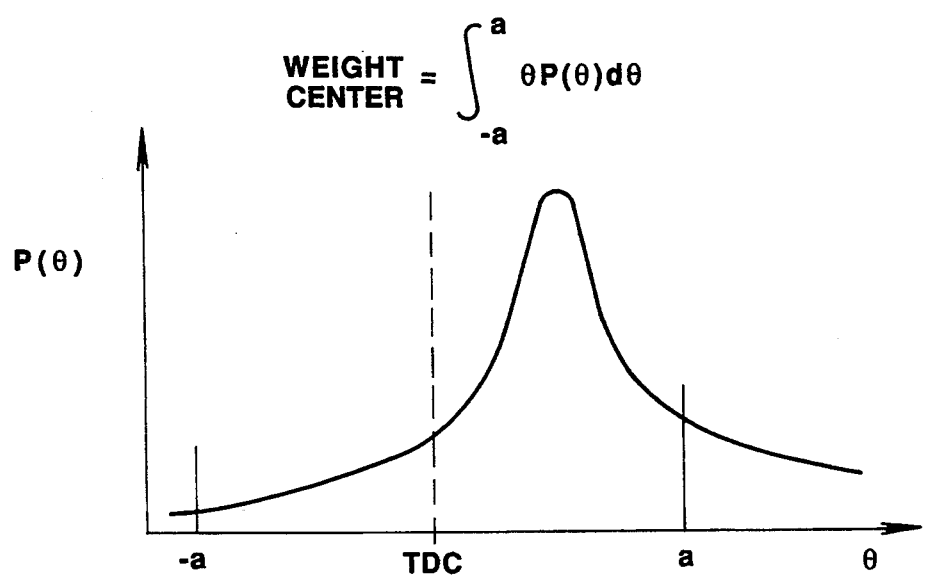
FIG. 14 is a characteristic graph of a weight center as another example of the combustion state variable.

In place thereof, the combustion state variable may be constituted by a difference between the combustion interval (a time interval from an actual ignition timing angle to $\theta$pmax) and the target value of the combustion interval of time as shown in FIG. 13.

Otherwise, the combustion state variable may be constituted by a difference between an actual weight center and a target value of the weight center.

The weight center can be derived as:

$$\int_{-a}^{a} \theta P(\theta)d\theta$$

—a denotes a predetermined crank angle position before the upper top dead center in the compression stroke and a denotes the predetermined crank ankle position after the same upper tot dead center.

In both cases, the same effects can be achieved.

As described herinabove, since, in the combustion state controlling apparatus according to the present invention, tile combustion state variable is averaged at the predetermined period of rich/lean state of the air/fuel mixture ratio and the EGR rate is controlled on the basis of the average value described above for each same rich/lean period, the variation of the EGR rate is not amplified or incremented even through the combustion state variable receives the variation due to the influence of the variation of the air/fuel mixture ratio which has not been considered so that tile EGR rate is controlled to the ideal EGR rate.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control apparatus for an internal combustion engine comprising:
   a) first means for detecting an engine operating condition;
   b) second means for setting a basic EGR rate on the basis of the detected engine operating condition;
   c) third means for detecting an inner cylinder pressure of the engine and outputting a signal waveform representing the inner cylinder pressure variation;
   d) fourth means for detecting a combustion state variable on the basis of the inner cylinder pressure variation signal waveform for each combustion of the engine;
   e) fifth means for detecting an air/fuel mixture ratio of the engine;
   f) sixth means for averaging the combustion state variable for each predetermined period of a rich state and lean state of the air/fuel mixture ratio based on the output signal of said fifth means;
   g) seventh means for correcting the basic EGR rate on the basis of an average value of the combustion variable derived by said sixth means to derive a final EGR rate; and,
   h) eighth means for controlling an exhaust gas recirculation from an exhaust gas system of the engine to an intake air system thereof on the basis of the final EGR rate.

2. A control apparatus for an internal combustion engine as set forth in claim 1, wherein said combustion state variable is a difference between a detected inner cylinder maximum timing and a target value.

3. A control apparatus for an internal combustion engine as set forth in claim 1, wherein said combustion state variable is a difference between a combustion interval from an ignition timing angle to the inner cylinder maximum timing value $\theta$pmax.

4. A control apparatus for an internal combustion engine as set forth in claim 1, wherein said combustion state variable is a difference between a weight center denoted by:

$$\int_{-a}^{a} \theta P(\theta)d\theta;$$

and a target value thereof.

5. A control apparatus for an internal combustion engine as set forth in claim 2, wherein said fourth means comprises a plurality of inner cylinder pressure sensors installed for respective engine cylinders and said fourth means includes inner cylinder maximum timing value detecting means for detecting a maximum of the inner cylinder pressure for each combustion $\theta$pmax from the signal waveform derived by each corresponding one of the inner cylinder pressure sensors and for deriving the difference between $\theta$pmax and the target value.

6. A control apparatus for an internal combustion engine as set forth in claim 5, wherein said target value is 15° after an upper top dead center in a compression stroke.

7. A control apparatus for an internal combustion engine as set forth in claim 6, wherein said sixth means includes ninth means for detecting rich/lean period T according to a variation of an air/fuel mixture ratio feedback correction coefficient $\alpha$ and derives the average value of the difference as M$\Delta\theta$pmax.

8. A control apparatus for an internal combustion engine as set forth in claim 7, wherein said seventh means derives the correction quantity for the final EGR rate as follows:

$\Delta$EGR = $\Delta$EGR − k × M$\Delta\theta$pmax and derives the final EGR rate as follows:

EGR rate = EGR$_{map}$ + $\Delta$EGR, wherein k denotes a constant and EGR$_{map}$ denotes the basic EGR rate.

9. A control apparatus for an internal combustion engine as set forth in claim 8, wherein said fifth means comprises an oxygen concentration sensor disposed in the exhaust gas system of the engine.

10. A control apparatus for an internal combustion engine as set forth in claim 9, wherein said average value of the difference $\Delta\theta$pmax is calculated as follows:

$M\Delta\theta pmax = SUM/NN$, wherein SUM denotes an accumulated value of $\Delta\theta pmax$ and NN denotes a number of samplings of $\Delta\theta pmax$ for each rich/lean period T.

11. An apparatus for controlling an EGR rate with a variation in air/fuel mixture ratio of an internal combustion engine taken into consideration, having an EGR control valve located in a passage communicated from an exhaust gas passage and intake air passage of the engine, said EGR rate controlling apparatus comprising:

a) an air fuel mixture ratio sensor which is located in an exhaust gas passage of the engine so as to provide an output signal indicating the air/fuel mixture ratio of the engine;

b) an engine operating condition sensor which is so constructed to detect an engine operating condition including an engine load and engine revolution speed;

c) basic EGR rate calculating means for deriving a basic EGR rate on the basis of the engine load and engine revolution speed;

d) combustion state determining factor detecting means for detecting a combustion state determining factor on the basis of each inner cylinder pressure variation of each engine cylinder;

e) rich/lean period determining means for determining a reverse of the air/fuel mixture ratio from a rich state to a lean state and vice versa on the basis of the variation in the detected air/fuel mixture ratio;

f) final EGR rate determining means for determining a final EGR rate for each rich/lean period on the basis of an average value of the combustion state determining factor for each rich/lean period and the basic EGR rate; and g) duty ratio signal output means for producing and outputting a pulse signal having a duty ratio corresponding to the final EGR rate to an electromagnetic valve associated with an EGR control valve.

* * * * *